US010271182B2

(12) United States Patent
Netto et al.

(10) Patent No.: US 10,271,182 B2
(45) Date of Patent: Apr. 23, 2019

(54) ENHANCED PUBLIC WARNING SYSTEM TO PROVIDE RICH CONTENT

(71) Applicant: BLACKBERRY LIMITED, Waterloo (CA)

(72) Inventors: John David Netto, Ottawa (CA); Shu-Lin Chen, Kanata (CA); Michael Eoin Buckley, Grayslake, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/812,413

(22) Filed: Jul. 29, 2015

(65) Prior Publication Data

US 2017/0034681 A1 Feb. 2, 2017

(51) Int. Cl.
H04W 4/06 (2009.01)
H04W 4/12 (2009.01)
H04W 4/90 (2018.01)
H04L 12/18 (2006.01)
H04W 76/50 (2018.01)

(52) U.S. Cl.
CPC ........... *H04W 4/12* (2013.01); *H04L 12/1895* (2013.01); *H04W 4/90* (2018.02); *H04W 76/50* (2018.02); *H04W 4/06* (2013.01)

(58) Field of Classification Search
CPC ... H04W 4/22; H04W 76/007; H04M 3/5116; H04M 2242/04
USPC ...................................................... 455/404.1
See application file for complete search history.

(56) References Cited

U.S. PATENT DOCUMENTS

| 8,238,891 | B1 * | 8/2012 | Tam ........................ H04W 4/12 455/418 |
| 9,167,402 | B2 | 10/2015 | Sammour | |
| 2009/0130972 | A1 * | 5/2009 | Andersen .............. H04W 8/245 455/3.01 |
| 2009/0233634 | A1 | 9/2009 | Aghili | |
| 2009/0253401 | A1 | 10/2009 | Lee | |

(Continued)

FOREIGN PATENT DOCUMENTS

WO WO2009/053111 4/2009
WO 2014/072321 5/2014

(Continued)

OTHER PUBLICATIONS

International Search Report and Written Opinion of the International Searching Authority issued in International Application No. PCT/US2016/053079 dated Jan. 2, 2017; 9 pages.

(Continued)

*Primary Examiner* — Kamran Afshar
*Assistant Examiner* — Nicole M Louis-Fils
(74) *Attorney, Agent, or Firm* — Fish & Richardson P.C.

(57) ABSTRACT

A method, device and a computer program product operable in a communications network to provide enhanced public warning system (PWS+) messages to a communication device over the current PWS system is disclosed. The method includes generating, at a server or network device, at least one public warning system (PWS) message and at least one enhanced PWS (PWS+) message, and associating the PWS+ message with the at least one PWS message. The at least one PWS+ message and the PWS message are transmitted via a communications network to the communication device.

11 Claims, 4 Drawing Sheets

(56) References Cited

U.S. PATENT DOCUMENTS

| | | | |
|---|---|---|---|
| 2010/0124898 A1* | 5/2010 | Qu | H04W 4/14 455/404.1 |
| 2010/0138754 A1 | 6/2010 | Wilson et al. | |
| 2011/0045796 A1 | 2/2011 | Lee | |
| 2011/0103308 A1* | 5/2011 | Lee | H04W 48/12 370/328 |
| 2011/0159837 A1* | 6/2011 | Daly | H04H 20/59 455/404.1 |
| 2013/0074120 A1* | 3/2013 | Adimatyam | H04N 21/25841 725/33 |
| 2013/0185561 A1 | 7/2013 | Brusilovsky | |
| 2014/0024332 A1 | 1/2014 | Droste | |
| 2014/0134970 A1 | 5/2014 | Pazos et al. | |
| 2014/0179258 A1 | 6/2014 | Arzelier | |
| 2014/0273910 A1 | 9/2014 | Ballantyne | |
| 2014/0286222 A1 | 9/2014 | Yu et al. | |
| 2014/0330743 A1 | 11/2014 | Ramakrishnan et al. | |
| 2014/0341059 A1 | 11/2014 | Jang | |
| 2014/0357183 A1 | 12/2014 | Rathonyi et al. | |
| 2014/0369326 A1 | 12/2014 | Wang et al. | |
| 2014/0378085 A1* | 12/2014 | Jeong | H04W 4/90 455/404.1 |
| 2015/0036658 A1 | 2/2015 | Mochizuki et al. | |
| 2015/0244532 A1 | 8/2015 | Bi et al. | |
| 2015/0280845 A1 | 10/2015 | Ballakur | |
| 2015/0372775 A1* | 12/2015 | Kwak | H04H 20/59 455/3.01 |
| 2016/0360476 A1 | 12/2016 | Kim et al. | |
| 2017/0013433 A1 | 1/2017 | Lee | |
| 2017/0215047 A1* | 7/2017 | Lee | H04W 4/06 |

FOREIGN PATENT DOCUMENTS

| | | |
|---|---|---|
| WO | WO2015/137730 | 9/2015 |
| WO | 2016/043567 | 3/2016 |

OTHER PUBLICATIONS

International Search Report and Written Opinion of the International Searching Authority issued in International Application No. PCT/US2016/044691 dated Oct. 20, 2016; 15 pages.

"Third Generation Partnership Project; Technical Specification Group Services and System Aspects; Study on Multimedia Broadcast Supplement for Publish Warning system (MBSP) (Release 14)"; 3GPP TR 22.815 V14.0.0: vol. SA WG1, No. V14.0.0; Dec. 19, 2014; pp. 1-22.

Third Generation Partnership Project; Technical Specification Group Services and System Aspects; Public Warning System (PWS) Requirements (Release 11); 3GPP TS 22.268 V11.5.0; vol. SA WG1, No. V11.5.0; Dec. 14, 2012; pp. 1-15.

"Third Generation Partnership Project; Technical Specification Group Radio Access Network; Evolved Universal Terrestrial Radio Access (E-UTRA); Radio Resource Control (RRC); Protocol Specification (Release 11)"; 3GPP TS 36.331 V11.12.0; vol. RAN WG2, No. V11.12.0; Jun. 30, 2015; pp. 1-357.

Office Action issued in related U.S. Appl. No. 14/862,143 dated Aug. 2, 2017; 28 pages.

Office Action issued in U.S. Appl. No. 14/862,143 dated Mar. 26, 2018, 28 pages.

United States Interview Summary issued in U.S. Appl. No. 14/862,143 dated May 17, 2018, 2 pages.

Advisory Action issued in U.S. Appl. No. 14/862,143 dated Jun. 20, 2018, 3 pages.

Non-Final Office Action issued in U.S. Appl. No. 14/862,143 dated Jul. 17, 2018, 16 pages.

Partial European Search Report pursuant to Rule 64 EPC issued in European Application No. 16849580.2 dated Feb. 27, 2019, 23 pages.

* cited by examiner

ENHANCED PUBLIC WARNING SYSTEM TO PROVIDE RICH CONTENT

BACKGROUND

The Public Warning System (PWS) provides timely and accurate alerts, warnings and information, regarding disasters and other emergencies. PWS is currently defined in the 3$^{rd}$ generation partnership project (3GPP) without security and provides a framework for regional emergency services such as the Korean Public Alert System (KPAS), European Warning System (EU-ALERT), Commercial Mobile Alert System (CMAS) and Earthquake and Tsunami Warning System (ETWS).

Information contained in a PWS message is text-based and can be delivered at a local or national level in a timely manner. Accordingly PWS messages are useful in providing a basic warning system. However, constraints within the existing standards (e.g. 3GPP) specification and implementation has led to difficulties in supporting richer and visual public safety content since text messages carry only human-readable characters and are of limited size. Examples of richer public safety content include maps with public safety mark-up, images of missing persons, evacuation information, weather warnings, emergency shelter locations, and assembly points etc.

In order to minimize the impact on mobile devices (referred to herein as user equipment or UE), impact on operators' networks, and cost, it is expected that a richer public safety content delivery solution re-use the existing PWS mechanism. Therefore, a means of extending PWS support to include larger binary (non-text based) data in the messages is needed in order to provide richer content in a backwards compatible manner. This richer content needs to be logically related to the legacy PWS messages, which they enhance, and delivered in a timely manner as applicable for the PWS message category (e.g. Presidential vs. Amber Alert).

SUMMARY

In accordance with aspects of the disclosure, there is provided a method, device and a computer program product operable in a communications network to provide enhanced public warning system (PWS+) messages to a communication device (e.g. mobile device or UE) over the current PWS system. The method includes operations of generating, at a server, at least one public warning system (PWS) message and at least one enhanced PWS (PWS+) message, and associating the PWS+ message with the at least one PWS message. The at least one PWS+ message and the PWS message are transmitted via a communications network to the communication device. In accordance with these and additional aspects, the present disclosure will now be described with particular reference to the accompanying drawings.

BRIEF DESCRIPTION OF THE DRAWINGS

The present disclosure is illustrated by way of example and not limited to the accompanying figures in which like reference numerals indicate similar elements and in which.

DETAILED DESCRIPTION

Figure 1:
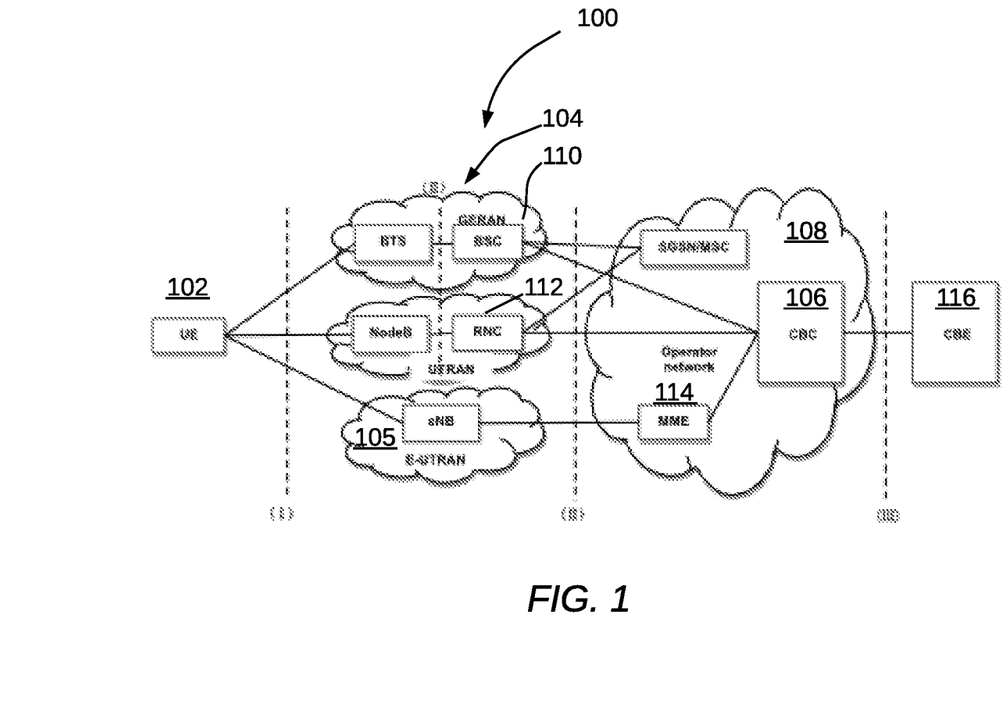
FIG. 1 is a schematic diagram of a PWS system architecture.

Turning now to the Figures, and referring to FIG. 1, there is depicted a high-level schematic of an illustrative public warning system (PWS) network architecture 100 that contains a plurality of network nodes and user equipment (UE) 102. A conventional PWS network architecture is modified in accordance with aspects of the disclosure to provide enhanced public warning system (PWS+) messages. As shown, the over-the-air interface between a communications device or user equipment (UE) 102 and access network (Um, Uu and LTE-Uu) 104, as currently implemented, has no security to ensure data integrity or authentication. PWS notification messages are broadcast to UE 102 either over the radio interface (e.g. via SYSTEM INFORMATION, or in the case of the ETWS primary notification for GERAN, via paging messages). In either case, no additional security is applied. A cell broadcast center (CBC) 106 (a first network node) is part of a core network 108 and connects to a network entity. For GERAN, CBC 106 connects with the access network entity BSC 110; and for UTRAN, CBC 106 connects with the access network entity RNC 112. For E-UTRAN 105, CBC connects with the core network entity MME 114 (a third network node). The protocols between the CBC and these network entities are defined in the following specifications (GERAN), [3GPP TS 25.419, "UTRAN Iu-BC Interface: Service Area Broadcast Protocol"]; and (UTRAN) [3GPP TS 23.041, "Technical realization of Cell Broadcast Service"] (GERAN/UTRAN/E-UTRAN). The CBC 106 (or another network node) is responsible for generating PWS and PWS+ messages. These messages are communicated to an eNodeB/BTS (second network nodes), which thereafter communicates/sends them to the UE 102 over the network/via radio interface.

Cell broadcast entity (CBE 116) (a fourth network node) is deployed on a national level and generally is considered to be outside of the scope of the 3GPP network. It is assumed and will be understood by those skilled in the art, that CBE 116 is responsible for all aspects of formatting the Cell Broadcast Service (CBS), including the splitting of a CBS message into a number of pages and the actual signing. It is also assumed for purposes of illustration, that there may be many CBEs 116 connected to a CBC 106.

In accordance with an aspect of the disclosure, the legacy PWS broadcast system is extended to transport richer binary data (PWS+ messages) (a second PWS message type) asynchronously and separately from the associated PWS text message (a first PWS message type). Only UEs 102 aware of the PWS+ service and with PWS+ functionality or capability (e.g. via a PWS+ software client), and with PWS+ message identifiers enabled (either by default or further to a manual selection of PWS+), are configured to receive and use this binary data. There may be one or more PWS+ messages associated to one PWS message.

Figure 2A:
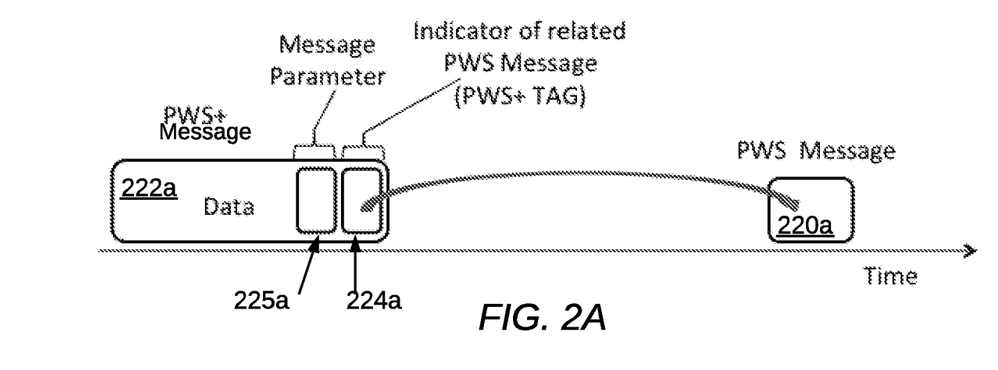
FIGS. 2A and 2B depict illustrative PWS and associated PWS+ messages in accordance with aspects of the disclosure.
Figure 2B:
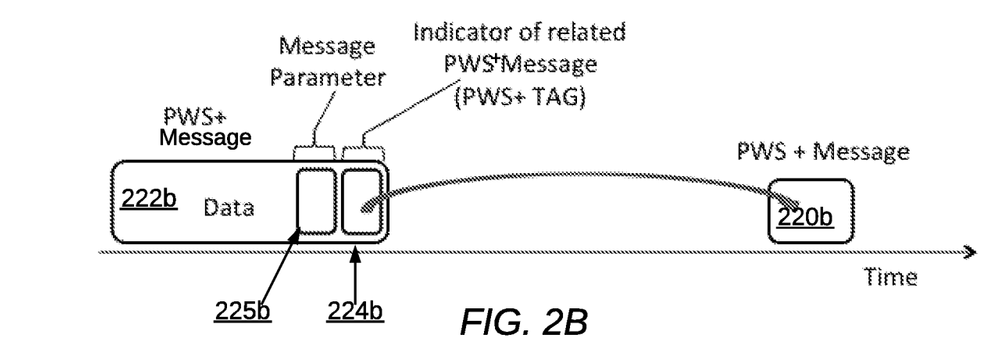

An example implementation of the second PWS message type (e.g. enhanced PWS+ service) is depicted in FIGS. 2A and 2B. Referring to FIG. 2A, a defined TAG/indication 224a in each PWS+ message 222a indicates the related first PWS message type (e.g. PWS message 220a). The contents of this TAG/indication 224a are sufficient to unambiguously indicate the associated PWS message, and can be constituted by the message identifier combined with the serial number of the PWS message. In addition the PWS+ message may contain a Message Parameter 225*a* as described below. As shown in FIG. 2B, a defined tag 224*b* associated with PWS+ message 222*b* can point to another PWS+ message 220*b*. Thus, each PWS+ message can be configured with a plurality of tags that associate with corresponding PWS and/or PWS+ messages. In addition the PWS+ message may contain a Message Parameter 225*b* as described below.

As an example for 3GPP GSM, the size of a standard PWS message consisting of a single page is limited to a block size of 82 bytes. PWS+, in accordance with aspects of the disclosure, utilizes the same structure and transport mechanism, but bytes 7-11 are allocated to identify the related PWS message as depicted in FIG. 2A and the table below.

| Octet Number(s) | Field |
|---|---|
| 1-2 | Serial Number |
| 3-4 | Message Identifier |
| 5 | Data Coding Scheme |
| 6 | Page Parameter |
| 7 | Message Parameter |
| 8-11 | PWS+ TAG (1$^{st}$ page only) or payload |
| 12-88 | Content of Message (payload) |

Other fields of the PWS+ message have the same function as for standard PWS messages. The PWS+ TAG contains the Serial Number and Message Identifier of the PWS message related to the PWS+ message (payload). In a more general case this could also refer to a PWS+ message. Bits 4 to 7 of the Message Parameter octet could indicate the total number of PWS+ messages with the same PWS+ TAG that should be expected to rebuild complete data, and bits 3 to 0 represent the current message number. For example, if data is split into two PWS+ messages, then Message Parameter could be set to 0010 0000 for the first PWS+ message and 0010 0001 for the second PWS+ message. Both PWS+ messages are transmitted using the same message identifier and same serial number.

When the PWS+ data to be transmitted exceeds the size of a single message page, then the data is split over multiple pages and transmitted using a message identifier allocated for this PWS+ message. Hence a PWS+ message may contain one or more pages, similar to PWS messages. A typical concatenated 15 block page PWS+ message would be about 1.2 kilobytes (KB) (typically transmitted over about 30 seconds). If more than one PWS+ message is used to transmit complete PWS+ data, then the data can be split into multiple PWS+ message as described above. The CBE 116 may split data among a plurality of PWS+ messages and transmits the Message Parameter for each of the PWS+ message.

As implemented, PWS+ can support content on the order of 4-15 KB. For sake of comparison, a simple 320×240 black and white image is 9.6 KB. Alternatively a color image (face sketch, basic map) with low entropy (complexity) can be compressed to within 4-15 KB with reasonable quality, with a transmission time between 1.5 minutes to 11 minutes. In the GSM example, multiple PWS+ messages may be associated with one PWS message to transmit multiple 1.2 KB data blocks.

An example of the PWS+ payload is shown here. The (supported) encoded type (jpeg, gif, bmp, . . . ) and the content size can be prefixed to the content binary data in the PWS+ payload for the PWS+ software client to decode and render as follows:

| JPEG | Size | Content binary data |
|---|---|---|

Another representation of the above diagram is shown in the table below. As can be seen, a single byte can be allocated to describe the content. However the content may be more than a single byte in length. Following the content description is a length identifier followed by the binary data.

| Octet Number(s) | Content of Message (payload) |
|---|---|
| 1) content | Describes the content e.g. jpeg, gif, bmp |
| X) Length | Length of the binary data |
| X + 1) data | Binary data |

The foregoing approach, which employs minimal overhead, is well suited for bandwidth-limited environments. It will be understood that although the example shown and described pertains to a single image file, this format can be extended recursively to support multiple image files if necessary.

The foregoing assumes data rates are limited by the use of GSM. For LTE-only service, larger PWS message sizes of 9.6 KB per PWS block page can be used. Comparatively GSM supports PWS message sizes of just 82 bytes per PWS block page resulting in more than a factor of 100 increase in data rate for an LTE-only system (9600/82>100).

Hence, a PWS message can have one or more related PWS+ messages; the concatenated set of PWS and related PWS+ messages are associated to a single event (Alert). The legacy PWS message Alert (notification/vibration/audio) will continue to adhere to specifications and notify the user immediately when received by the UE 102. To satisfy timing requirements, a PWS+ message can be transmitted either before or after the associated PWS text message. Hence, PWS+ message content will be displayed along with the associated PWS message, if available at the UE 102 when the PWS message is displayed. If a PWS+ message is received prior to an associated PWS message, the PWS+ message is buffered and then displayed or rendered along with the associated PWS message upon receipt of the PWS message from the network by the UE 102. A PWS+ message received after the associated PWS message may be displayed or rendered as an extension/update to the initial Alert (text message). A common rendering scheme can be applied to the related set of PWS+ messages for a given PWS message.

Figure 3:
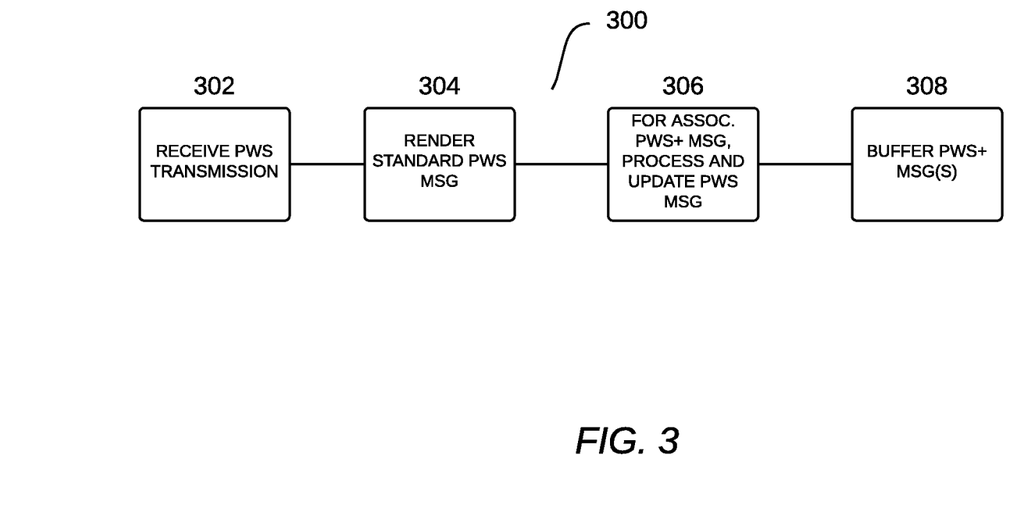
FIG. 3 is a flow diagram of a process in accordance with an aspect of the disclosure.

FIG. 3 is a flow diagram of a process 300 for a PWS+ capable UE 102, which is configured to receive message identifiers allocated to PWS+ messages and message identifiers allocated to PWS messages. In accordance with an aspect of the disclosure, process 300 comprises the following operations. At block 302, the UE 102 receives a PWS transmission(s) based on the list of supported message identifiers. At block 304, the UE 102 handles (e.g., renders, displays or otherwise processes) the regular PWS message(s) (e.g. the PWS transmission which was received in block 302) per the 3GPP standard. At block 306, if the PWS message(s) has an associated PWS+ message or messages which were transmitted over the network and received by the UE, the UE 102 then processes and updates the PWS alert notification. If the PWS+ message is received prior to the associated PWS message, then the UE buffers the PWS+ message until receipt of the associated PWS message at block 308.

Figure 4:
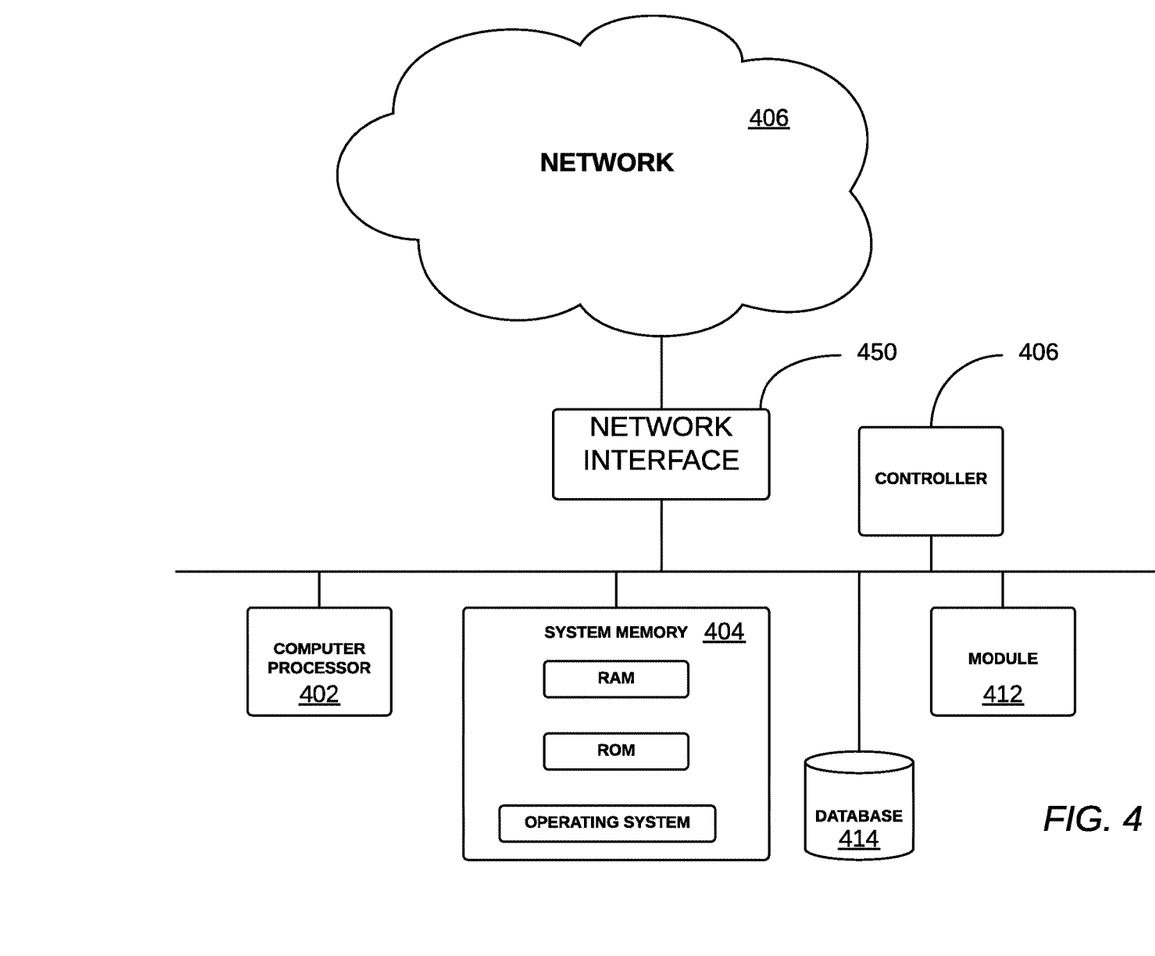
FIG. 4 is a schematic of an example server and networking environment for carrying out aspects of the disclosure.

FIG. 4 is schematic diagram of an illustrative architecture 400 of a computerized system for carrying out aspects of the disclosure. A network interface 450 couples to a communications network 406, and at least one computer processor 402, system memory 404 including random access memory (RAM), read only memory (ROM) and an operating system stored in persistent memory, an I/O controller 406, database 414 and at least one module 412 for implementing PWS+ alerts at a server or other network component. The computer processor 402 may comprise one more microprocessors, co-processors, or the like, and is in communication with network interface 450 to communicate data via network 406. The network interface 450 can include a plurality of communication channels for simultaneous communication with other processors, servers, etc. Module 412 comprises program code that is executable by a computer processor 402 to implement the functionality of the PWS/PWS+ as described previously.

The present disclosure may be embodied within a system, a method, a computer program product or any combination thereof.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes are presented in terms of algorithms or instructions and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The drawings and the description above relate to various embodiments by way of illustration only. It is noted that wherever practicable similar or like reference numbers may be used in the drawings and may indicate similar or like functionality. The drawings depict embodiments of the disclosed system (or method) for purposes of illustration only. One skilled in the art will readily recognize from the following description that alternative embodiments of the structures and methods illustrated and described herein may be employed without departing from the principles described herein.

Some embodiments may be described using the expression "coupled" and "connected" along with their derivatives.

It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Upon reading this disclosure, those of skill in the art will appreciate still additional alternative structural and functional designs for a system and a process for generating enhanced PWS+ message alerts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method at a network node to provide enhanced public warning system (PWS+) messages to a communication device, comprising:
   splitting, at the network node, rich content binary data into a plurality of data segments to be decoded and rendered at the communication device;
   for each data segment of the plurality of data segments, generating, at the network node, a respective enhanced public warning system (PWS+) message, wherein the respective PWS+ message includes a payload including that data segment of the rich content binary data and a respective message parameter, and the respective message parameter indicates at least one of a total number of PWS+ messages for the rich content binary data, or a current message number for the respective PWS+ message;
   generating, at the network node, a PWS message, wherein the PWS message is configured to transmit text based data and the PWS+ message is configured to transmit non-text based data, and wherein the PWS message includes a text message associated with the rich content binary data in the PWS+ messages;
   generating a tag comprising a message identifier and a serial number of the PWS message;
   associating each PWS+ message with the PWS message by including the tag in each PWS+ message; and
   sending each PWS+ message and the PWS message to the communication device, wherein the each PWS+ message is sent asynchronously and separately from the PWS message.

2. The method of claim 1, wherein the network node comprises at least one of a Cell Broadcast Center (CBC), Base Transceiver Station (BTS), Evolved Node (eNodeB), Node B and or a Cell Broadcast Entity (CBE).

3. The method of claim 2, further comprising:
   sending, from the network node, at least one PWS message; and
   sending, from the network node, at least one PWS+ message associated with the at least one PWS message.

4. The method of claim 2, further comprising the network node allocating a message identifier to each PWS+ message.

5. The method of claim 1, wherein the PWS+ message is sent prior to or subsequent to the associated PWS message.

6. A network node, comprising:
   memory storing program instructions that when executed by at least one processor, cause the network node to:
      split, at the network node, rich content binary data into a plurality of data segments to be decoded and rendered at a communication device;
      for each data segment of the plurality of data segments, generate, at the network node, a respective enhanced public warning system (PWS+) message, wherein the respective PWS+ message includes a payload including that data segment of the rich content binary data and a respective message parameter, and the respective message parameter indicates at least one of a total number of PWS+ messages for the rich content binary data, or a current message number for the respective PWS+ message;
      generate, at the network node, a PWS message, wherein the PWS message is configured to transmit text based data and the PWS+ message is configured to transmit non-text based data, and wherein the PWS message includes a text message associated with the rich content binary data in the PWS+ messages;
      generate a tag comprising a message identifier and a serial number of the PWS message;
      associate each PWS+ message with the PWS message by including the tag in each PWS+ message; and
      send each PWS+ message and the PWS message to the communication device, wherein the each PWS+ message is sent asynchronously and separately from the PWS message.

7. The network node of claim 6, wherein each PWS+ message is allocated a message identifier.

8. The network node of claim 6, wherein the PWS+ message is sent prior or subsequent to the associated PWS message.

9. A non-transitory memory medium storing program instructions that when executed by at least one processor, cause a network node to provide enhanced public warning system (PWS+) messages to a communication device, by:
   splitting, at the network node, rich content binary data into a plurality of data segments to be decoded and rendered at the communication device;
   for each data segment, generating, at the network node, a respective enhanced public warning system (PWS+) message, wherein the respective PWS+ message includes a payload including that data segment of the rich content binary data and a respective message parameter, and the respective message parameter indicates at least one of a total number of PWS+ messages for the rich content binary data, or a current message number for the respective PWS+ message;
   generating, at the network node, a PWS message, wherein the PWS message is configured to transmit text based data and the PWS+ message is configured to transmit non-text based data, and wherein the PWS message includes a text message associated with the rich content binary data in the PWS+ messages;
   generating a tag comprising a message identifier and a serial number of the PWS message;
   associating each PWS+ message with the PWS message by including the tag in each PWS+ message; and sending each PWS+ message and the PWS message to the communication device, wherein the each PWS+ message is sent asynchronously and separately from the PWS message.

10. The non-transitory memory medium of claim 9, further comprising program instructions stored in memory at a second network node, that when executed by a processor, cause the second network node to send at least one PWS+ message to the communication device.

11. The method of claim 1, wherein the rich content binary data comprises image data.

* * * * *